Aug. 29, 1967  A. D. HEINY  3,339,096
BRUSH RIGGING FOR DYNAMOELECTRIC MACHINES
Filed June 26, 1964  3 Sheets-Sheet 1

INVENTOR.
Arza D. Heiny
BY C. R. Meland
HIS ATTORNEY

Aug. 29, 1967  A. D. HEINY  3,339,096
BRUSH RIGGING FOR DYNAMOELECTRIC MACHINES
Filed June 26, 1964  3 Sheets-Sheet 2

INVENTOR.
Arza D. Heiny
BY C. R. Meland
HIS ATTORNEY

Aug. 29, 1967  A. D. HEINY  3,339,096
BRUSH RIGGING FOR DYNAMOELECTRIC MACHINES
Filed June 26, 1964  3 Sheets-Sheet 3

INVENTOR.
Arza D. Heiny
BY C. R. Meland
HIS ATTORNEY

United States Patent Office 3,339,096
Patented Aug. 29, 1967

3,339,096
BRUSH RIGGING FOR DYNAMOELECTRIC MACHINES
Arza D. Heiny, Carmel, Ind., assignor to General Motors Corporation, Detroit, Mich., a corporation of Delaware
Filed June 26, 1964, Ser. No. 378,287
1 Claim. (Cl. 310—68)

This invention relates to brush rigging for dynamoelectric machines and more partcularly to brush rigging for a diode rectified alternating current generator.

The present invention is an improvement of the brush rigging disclosed and claimed in co-pending application, Ser. No. 139, 746, filed Sept. 21, 1961, and assigned to the assignee of this invention.

In application Ser. No. 139,746, a brushholder for a diode rectifying alternator is disclosed which has brushes that contact the slip rings of a rotor and which has means for maintaining the brushes retracted by a rod which can pass through openings in the end frame of the generator and through openings in the brushholder.

In that application, the brushholder has two terminals, one of which is connectible with a voltage regulator and the other of which is connected to a junction of two diodes. This latter terminal can be used to energize relays and for other purposes and provides a signal voltage which indicates that the alternator is developing an output voltage. The present invention is concerned with a simplification of the brushholder disclosed in the above-mentioned co-pending application and is also concerned with the elimination of certain parts thought to be required in the construction of application Ser. No. 139,746.

It accordingly is one of the objects of this invention to provide a simple and economical brushholder which not only performs a brushholder function but which is capable of supporting a terminal that connects the junction point of two diodes of a bridge rectifier to an external device such as a relay.

Another object of this invention is to provide a terminal connection for the junction point of two diodes of a diode rectified alternator by using a one-piece terminal which has one end connected to the junction point of the two diodes and which is supported by the insulating material of the brushholder.

Another object of this invention is to provide a brushholder of the type described which can be secured directly to the end frame of a generator without the use of separate insulating parts.

Another object of this invention is to provide a brushholder assembly which is capable of supporting the brushes for a diode rectified alternator and which is also capable of providing terminal connections for a voltage regulator and for a diode junction connection, the body of the brushholder supporting all of these parts and being capable of being assembled directly to the end frame of the generator to thereby simplify the assembly of the brushholder to the end frame of the generator.

Further objects and advantages of the present invention will be apparent from the following description, reference being had to the accompanying drawings wherein preferred embodiments of the present invention are clearly shown.

Figure 1:
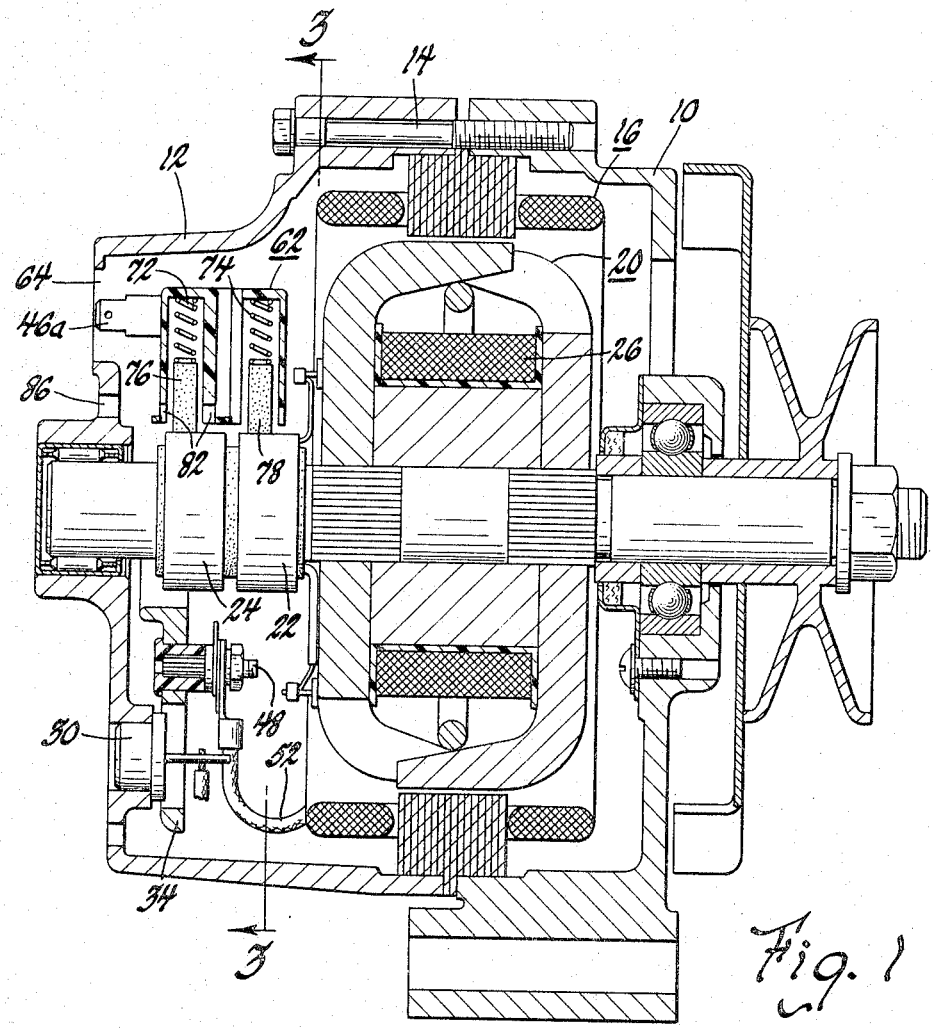
FIGURE 1 is a sectional view of a diode-rectified alternator that has the brushholder assembly of this invention.

Referring now to the drawings and more particularly to FIGURE 1, the reference numerals 10 and 12 designate the end frames of a diode-rectified alternating current generator. The end frames are held together by bolts 14 and support a stator assembly which includes a three phase Y-connected output winding 16.

The end frames support a rotor generally designated by reference numeral 20 and this rotor is journalled for rotation in bearings located in the end frames. The rotor has slip rings 22 and 24 which are electrically connected with a field winding 26 which forms a part of the rotor.

The end frame 12 supports three negative diodes of the silicon type 28, 30 and 32 which are located partially within openings formed in the end frame 12 as is depicted in FIGURE 1.

The end frame 12 contains and supports a metal heat sink 34 which has openings that receive the ends of three positive silicon diodes 36, 38 and 40. The heat sink 34 is electrically insulated from the end frame 12.

Figure 2:
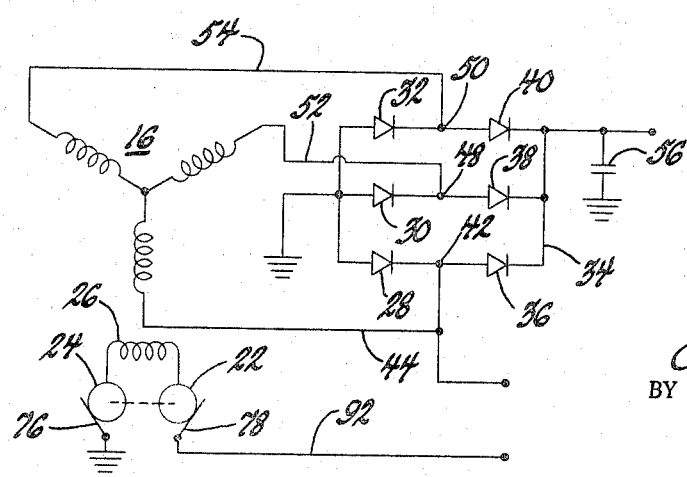
FIGURE 2 is a schematic circuit diagram of the field, output winding and diodes of the generator shown in FIGURE 1.

The diodes 28 and 36 are connected together at a terminal 42 which is also connected to a phase lead wire 44 coming from winding 16 and to a terminal 46 which is to be more fully described hereinafter. The terminal 42 is supported by an insulator that in turn is supported by the heat sink 34. In a similar fashion, the diodes 30 and 38 are connected together at terminal 48 and the diodes 32 and 40 are connected together at a terminal 50. The terminals 48 and 50 are connected with phase leads 52 and 54 coming from the three phase output winding 16. This connection is depicted in the schematic circuit diagram of FIGURE 2.

The end frame 12 has an opening which receives the outer case of a capacitor 56, the opposite end of the capacitor being connected with the metal heat sink 34 which in effect is the positive terminal of the bridge rectifier. The heat sink 34 is secured to the end frame 12 by screws 58 and 60, the screw 58 forming an insulated positive terminal for the bridge rectifier.

Figure 3:
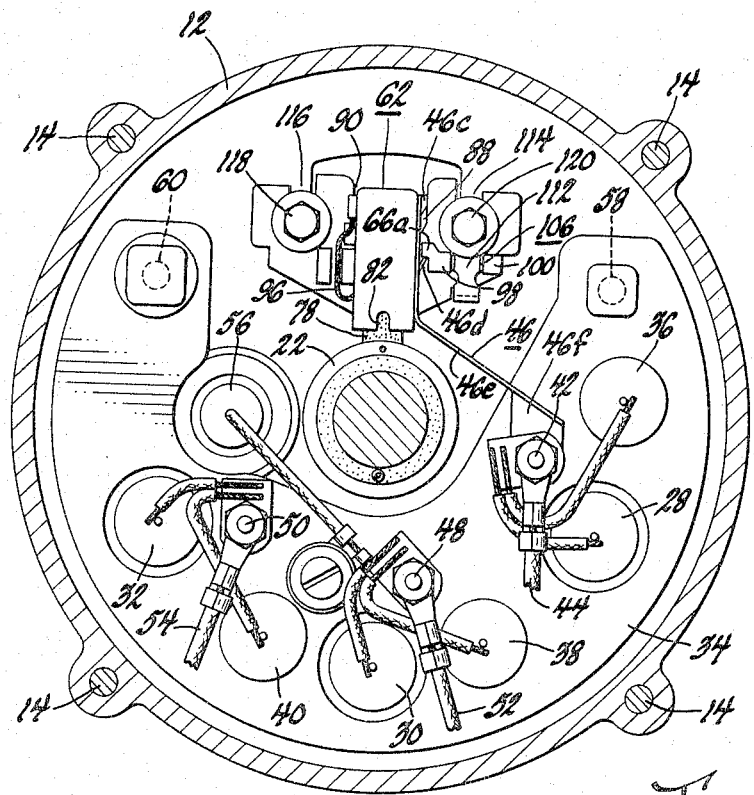
FIGURE 3 is a sectional view taken along line 3—3 of FIGURE 1.

The brushholder assembly for the diode rectified generator is generally designated by reference numeral 62. This brushholder assembly is located within the top portion of the end frame 12 as is seen in FIGURES 1 and 3 and is located to be at least partially in alignment with an opening 64 formed in the end frame 12.

Figure 4:
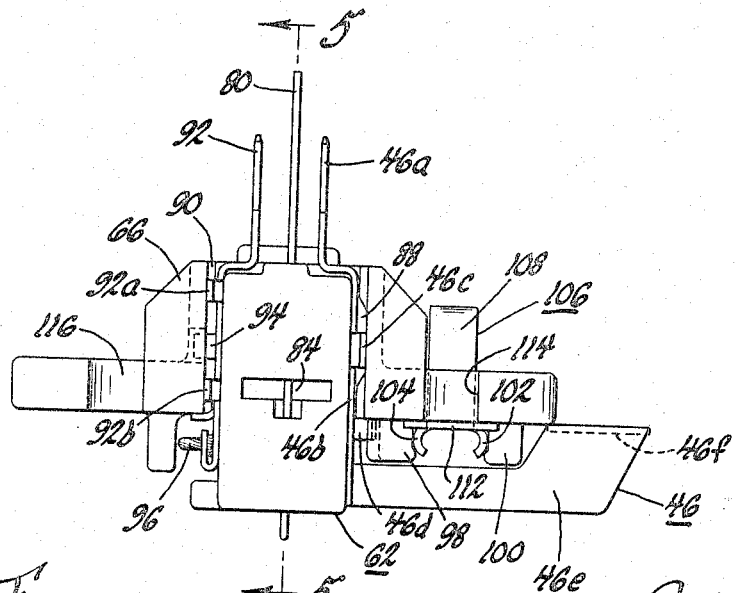
FIGURE 4 is a top view of the brushholder assembly which is used in the generator of FIGURE 1.
Figure 6:
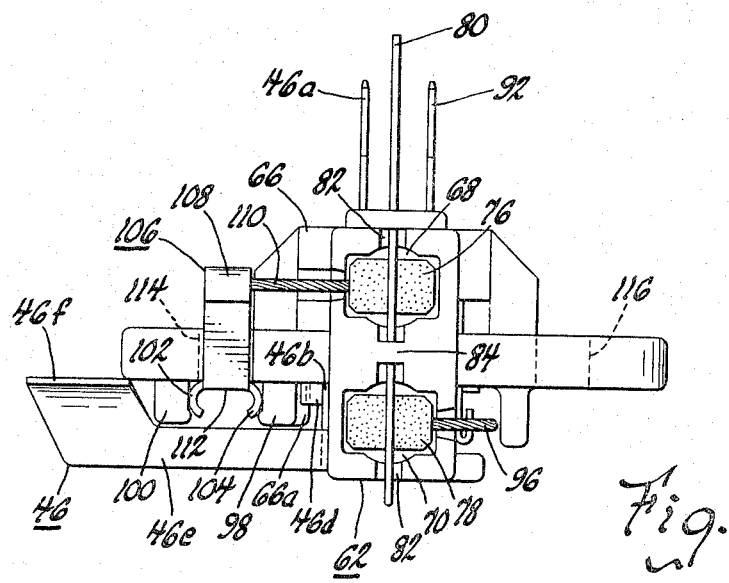
FIGURE 6 is a lower plan view of the brushholder shown in FIGURE 4.
Figure 5:
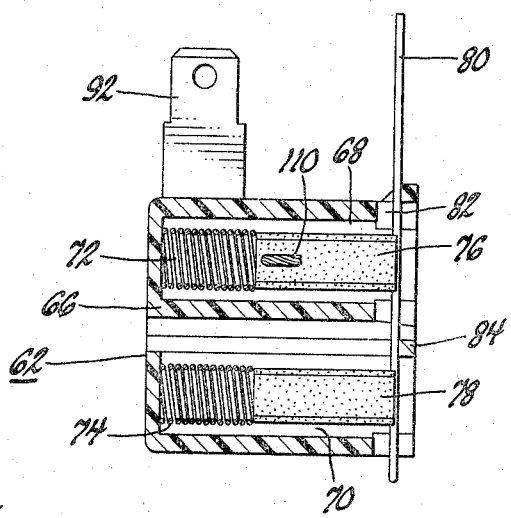
FIGURE 5 is a sectional view taken along line 5—5 of FIGURE 4.

The brushholder 62 is shown in greater detail in FIGURES 4, 5 and 6 and includes a body section 66 which is formed as a one-piece plastic molding. This body section has open-ended compartments 68 and 70 for receiving the springs 72 and 74 and the brushes 76 and 78. The brushes can be held in a retracted position against the force of the springs by a rod 80 which passes through slot 82 formed in the brushholder body. The rod 80 engages a transverse portion 84 of the brushholder body when it is inserted. The rod 80 is also designed to pass through a small opening 86 formed in the end frame 12 when the brushholder assembly is assembled to the end frame 12.

The body section of the bushholder has a slot 88 which receives a portion of terminal generally designated by reference numeral 46. The terminal 46 has a male terminal portion 46a which is adapted to be inserted into a complementary female terminal. In addition, the terminal 46 has a section 46b located in the slot 88. The section 46b has struck out portions 46c and 46d. The struck out portion 46c engages one side wall of the slot 88 and urges the section 46b against the other side wall of the slot 88 to provide a tight fit for the terminal within the slot when it is assembled to the slot. The struck out portion 46d engages a projecting portion 66a of the brushholder. The section 66a is best illustrated in FIGURE 3 where it is seen that the struck out portion 46b of the terminal snaps behind the section 66a when the terminal is inserted in the slot 88. In addition, the terminal 46 has a section 46e which is located at an angle of about 33° to the section 46b of the terminal 46. The end of section 46e is provided with a section 46f and this section has an opening which receives the terminal 42 as shown in FIGURE 3.

It can be seen that when the brushholder assembly 62 is in place within the end frame 12, the terminal 46 is supported by the body portion of the brushholder in slot 88 and forms an electrical connection between the terminal 42 and the male terminal portion 46a. This provides an external electrical connection of the terminal 42 which is located between diodes 28 and 36 as seen on the schematic circuit diagram of FIGURE 2.

The body portion 66 of the brushholder has another slot 90 which is parallel to the slot 88. The slot 90 receives a male terminal 92 having an outwardly struck tab 94 which snap fits into a slot formed in the body portion 66 when the terminal 92 is slipped axially into the slot 90. The terminal 92 has outwardly struck tabs 92a and 92b which engage one side of slot 90.

The male terminal 92 is connected with a conductor 96 and this conductor is connected with the brush 78. From the foregoing, it will be appreciated that the terminal 92 is electrically connected with the brush 78 and therefore will be electrically connected with the slip ring 22 when the brushholder is assembled to the end frame 12. The terminal 92 will be electrically connected with a voltage regulator and supplies field current to one side of the field winding 26 of the generator.

The main body portion 66 of the brushholder has projections 98 and 100 which engage the arcuate spring finger sections 102 and 104 of a terminal clip 106. The terminal clip 106 has a section 108 which is connected with conductor 110. The arcuate portions 102 and 104 extend from section 112 of the terminal clip 106 and this section has an opening which is aligned with a slot 114 formed in the main body portion 66 of the brushholder. Section 112 of the terminal clip 106 is located at a right angle to the section 108 of this terminal clip.

The conductor 110 which is connected with terminal clip 106 is connected with the brush 76. When the brushholder is secured to the end frame 12, the terminal clip 106 is grounded to the end frame 12 and the brush 76 is grounded.

Before the brushholder assembly 62 is assembled to the end frame 12, the main body portion 66 of the brushholder is fitted with the various parts including the springs 72 and 74, the brushes 76 and 78, the terminals 46 and 92 and the terminal clip 106. The brushes are held retracted within the chambers by the rod 80 which engages the ends of the brushes in a manner illustrated in FIGURE 5. When the brushholder assembly is completed, it takes the form shown in FIGURES 4, 5 and 6 and it now is ready for assembly to the end frame 12.

In assembling the brushholder assembly 62 to the end frame 12, the brushholder is positioned such that the slots 114 and 116 are aligned with threaded openings in the end frame 12 and the rod 80 is passed through the opening 86 in the end frame 12. Following this, the screws 118 and 120 are started into place through the slots 114 and 116 and into the threaded holes. After the screws 118 and 120 are tightened, the brushholder is attached to the end frame 12 and when the rotor is then assembled to the end frame, the rod 80 can be withdrawn to permit the brushes 76 and 78 to move into engagement with the slip rings 22 and 24.

It will be appreciated that the metal screw 120 engages the section 112 of the terminal clip 106 and therefore electrically connects this terminal clip with the metal end frame 12 which is grounded. The terminal 46 is completely insulated from ground by the body portion of the brushholder and this terminal is connected to terminal 42 during assembly of the brushholding assembly 62 to the end frame 12. The male terminal 92 which is supported by the main body portion of the brushholder is completely insulated from the end frame 12 by the brushholder but is electrically connected to brush 78 as has been described.

While the embodiments of the present invention is heredisclosed constitute a preferred form, it is to be understood that other forms might be adopted.

What is claimed is as follows:

A combined brushholder and terminal support for use in combination with an electrical generator and a diode bridge rectifier circuit comprising, a main body portion of insulating material, a pair of chambers formed in said body portion adapted to receive and slidably support respective brushes, at least one slot formed in said body portion and a single piece terminal member including a mid-section having a struck out portion fitted within said slot in such a manner that said struck out portion engages the side walls of said slot whereby said terminal member is totally supported by said main body portion, a first integral section extending beyond said slot for connection to an external female terminal and a second integral section extending in the opposite direction beyond said slot for connection to one of the direct current output terminals of said diode bridge rectifier circuit.

References Cited
UNITED STATES PATENTS

| | | | |
|---|---|---|---|
| 3,001,121 | 9/1961 | Kerr | 310—68 |
| 3,014,140 | 12/1961 | Tupper | 310—71 |
| 3,106,656 | 10/1963 | Merriam | 310—239 |
| 3,127,533 | 3/1964 | Gardner | 310—239 |
| 3,146,362 | 8/1964 | Bates | 310—68 |
| 3,189,772 | 6/1965 | Wingler | 310—71 |
| 3,226,581 | 12/1965 | Brewster | 310—68 |
| 3,242,362 | 3/1966 | Ciliax | 310—239 |
| 3,253,167 | 5/1966 | Bates | 310—68 |
| 3,267,312 | 8/1966 | Redick | 310—68 |

MILTON O. HIRSHFIELD, *Primary Examiner.*

J. D. MILLER, *Assistant Examiner.*